(12) United States Patent
Chen et al.

(10) Patent No.: US 9,308,486 B2
(45) Date of Patent: Apr. 12, 2016

(54) METHOD OF USING A STRUCTURED ADSORBENT BED FOR CAPTURE OF CO2 FROM LOW PRESSURE AND LOW PRESSURE CONCENTRATION SOURCES

(71) Applicant: L'Air Liquide Societe Anonyme Pour l'Etude et l'Exploitation des Procedes Georges Claude, Paris (FR)

(72) Inventors: Yudong Chen, Garnet Valley, PA (US); Christian Monereau, Montpellier (FR); Edgar S. Sanders, Jr., Newark, DE (US); Pascal Tessier, Wilmington, DE (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 125 days.

(21) Appl. No.: 14/084,917

(22) Filed: Nov. 20, 2013

(65) Prior Publication Data

US 2015/0135951 A1    May 21, 2015

(51) Int. Cl.
*B01D 53/04*    (2006.01)
*B01J 20/28*    (2006.01)

(52) U.S. Cl.
CPC ........ *B01D 53/0462* (2013.01); *B01D 53/0438* (2013.01); *B01D 2253/102* (2013.01);
(Continued)

(58) Field of Classification Search
CPC .............. B01D 53/04; B01D 53/0438; B01D 53/0462; B01D 2259/40096
USPC ...................................... 95/96, 106, 115, 148
See application file for complete search history.

(56) References Cited

U.S. PATENT DOCUMENTS 3,608,273 A * 9/1971 Fabuss et al. .................. 95/148
4,421,532 A 12/1983 Sacchetti et al.
(Continued)

FOREIGN PATENT DOCUMENTS

DE  198 05 011    8/1999
DE  198 49 389    5/2000
(Continued)

OTHER PUBLICATIONS

International Search Report and Written Opinion for related PCT/US2014/066717, Mar. 24, 2015.
(Continued)

*Primary Examiner* — Frank Lawrence
(74) *Attorney, Agent, or Firm* — Elwood L. Haynes

(57) ABSTRACT

A structured adsorbent sheet, is provided including a nano-adsorbent powder, and a binder material, wherein the nano-adsorbent powder is combined with the binder material to form an adsorbent material, and a porous electrical heating substrate, wherein the adsorbent material is applied to the porous electrical heating substrate thereby forming a structured adsorbent sheet. A structured adsorbent module is provided, including a plurality of stacked structured adsorbent sheets, configured to produce a plurality of fluid passages, wherein the plurality of fluid passages have a cross-sectional shape in the direction of a fluid stream. The structured adsorbent module may have a cross-sectional shape that is trapezoidal, rectangle, square, triangular or sinusoidal. A structured adsorbent bed is provided, including a plurality of modules, stacking the modules, thereby providing a plurality of process fluid passages, and a process fluid inlet and a process fluid outlet, in fluid communication with the plurality of process fluid.

6 Claims, 15 Drawing Sheets

(52) U.S. Cl.
CPC ..... *B01D2253/104* (2013.01); *B01D 2253/106* (2013.01); *B01D 2253/108* (2013.01); *B01D 2253/202* (2013.01); *B01D 2253/34* (2013.01); *B01D 2257/504* (2013.01); *B01D 2258/0283* (2013.01); *B01D 2259/40096* (2013.01)

(56) References Cited

U.S. PATENT DOCUMENTS

| | | | |
|---|---|---|---|
| 4,552,570 A * | 11/1985 | Gravatt | 95/10 |
| 5,032,156 A | 7/1991 | Luder et al. | |
| 5,069,038 A | 12/1991 | Peinze | |
| 5,308,457 A * | 5/1994 | Dalla Betta et al. | 95/143 |
| 5,505,825 A * | 4/1996 | Gold et al. | 95/126 |
| 5,667,713 A | 9/1997 | Kuma | |
| 5,693,123 A | 12/1997 | Klobucar | 96/125 |
| 7,172,645 B1 * | 2/2007 | Pfister et al. | 95/116 |
| 8,940,072 B2 * | 1/2015 | Boulet et al. | 55/523 |
| 2001/0015131 A1 * | 8/2001 | Angermann et al. | 95/90 |
| 2002/0022146 A1 | 2/2002 | Keefer et al. | |
| 2003/0037672 A1 * | 2/2003 | Sircar | 95/96 |
| 2004/0118287 A1 | 6/2004 | Jaffe et al. | |
| 2008/0314245 A1 | 12/2008 | Hershkowitz et al. | |
| 2013/0061756 A1 * | 3/2013 | Hung et al. | 96/126 |
| 2013/0152787 A1 | 6/2013 | Boulet et al. | |

FOREIGN PATENT DOCUMENTS

| | | |
|---|---|---|
| EP | 1 382 375 | 1/2004 |
| EP | 1 413 348 | 4/2004 |
| GB | 2 398 522 | 8/2004 |
| WO | WO 2015 077510 | 5/2015 |
| WO | WO 2015 077513 | 5/2015 |

OTHER PUBLICATIONS

International Search Report and Written Opinion for corresponding PCT/US2014/066720, Feb. 16, 2015.

International Search Report and Written Opinion for related PCT/US2014/066724, Jul. 21, 2015.

* cited by examiner

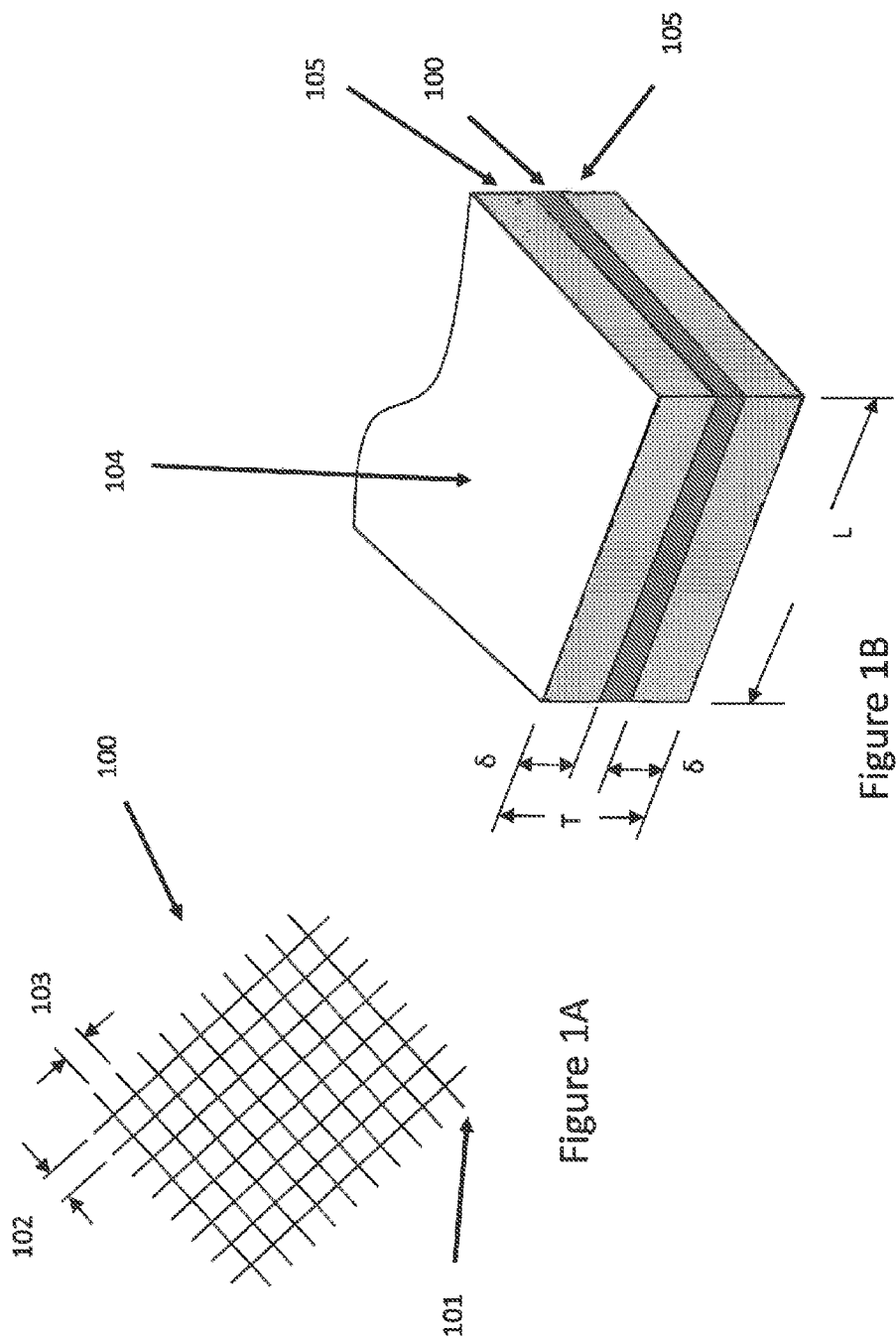

Table 1, estimated characteristic parameters for structured adsorbent

|  | Adsorbent thickness (mm) | Channel opening (mm) | Substrate thickness (mm) | Adsorbent fraction(%) |
|---|---|---|---|---|
| Case 1 | 0.2 | 0.15 | 0.1 | 57.1 |
| Case 2 | 0.2 | 0.5 | 0.1 | 42.9 |
| Case 3 | 0.5 | 0.5 | 0.1 | 65.2 |
| Case 4 | 0.75 | 0.8 | 0.1 | 67.2 |
| Conventional beaded bed | 1.5 (particle radius) |  |  | ~60.0 |

Figure 4
Estimated Characteristic Parameters for Structured Adsorbent

METHOD OF USING A STRUCTURED ADSORBENT BED FOR CAPTURE OF CO2 FROM LOW PRESSURE AND LOW PRESSURE CONCENTRATION SOURCES

BACKGROUND

Interest in recovery CO2 from various CO2 containing gas mixture is propelled by multiple factors: the merchant CO2 market, enhanced oil recovery (EOR) and greenhouse gas emissions reduction. However, majority of CO2 sources are from low pressure gas mixtures having relatively low concentration of CO2. Such sources, for example, include the flue gas from a fossil fuel-fired power plant, an industrial furnace, a cement kiln, or an oxy or air combustion facility, or the exhaust gas of an engine or lime kiln. Typically, the flue gas is obtained at near ambient pressure (<3 bara). The concentration of CO2 in the flue gas ranges from approximately 5 to 25%, with a balance of mostly nitrogen. The flue gas flow rate is numerous.

Conventionally, most commercial CO2 recovery plants use processes based on chemical absorption with a monoethanolamine (MEA) solvent. MEA was developed over 60 years ago for removing CO2 and H2S from natural gas streams. However, the process suffers large equipment costs and high regeneration energy requirements. Recently, a CO2 CPU (compression and purification unit) process was proposed to capture the CO2 from SMR (steam methane reforming) plant H2 PSA (pressure swing adsorption) off gas. The benefit of the process is that the waste gas from the CPU plant, which normally contains significant amount of H2 at high pressure, can be recycled back to the PSA for additional H2 production credit. But the CPU process requires high compressing and cold temperature operation, especially, when the CO2 concentration in the feed to CPU process is low, such as in the case of flue gas. The application of the CPU process in CO2 capture is economically adjustable only when the feedstock contains relative higher amount CO2 concentration, for example 50%.

Recovery CO2 from flue gas sources by using adsorption technologies was proposed earlier. Paul Webley's group used vacuum swing adsorption (VSA) process to recover CO2 from power plant exhaust gases by applying conventional 13× adsorbent. However, the use of a vacuum pump limits the process to be operated at a very fast cycle time and therefore the productivity remains relatively low. Energy consumption is high due to the necessity of vacuum. On the other hand, thermal swing adsorption (TSA) processes were also proposed by many groups to remove CO2 from air or flue gases. For example, there are studies in operating TSA at relative short cycle by designing adsorbers as a heat exchanger type (including heat exchange tubes inside adsorbent bed or coating adsorbent onto surface of heat exchange tubes) to increase heat transfer in and out of adsorbents. But the amount of adsorbent loading per unit volume is low leading to large and costly adsorber even at reduced cycle time. Therefore, there is an urgent need for developing a technology which can capture CO2 from low pressure sources having CO2 concentration in a range of 5 to 30% more economically.

The proposed invention is to design a rapid cycle thermal swing adsorption process to capture CO2 from low pressure and low concentration CO2 sources utilizing the novel structured adsorbent bed configuration with electric energy to regenerate the adsorbent bed. This new compact design allows operating the thermal swing adsorption process at a much faster cycle speed than the conventional pellet-loaded adsorbent bed, therefore to significantly increase $CO_2$ production yield. The design of new rapid cycle thermal swing adsorption (RTSA) process has advantages of the same or even higher overall adsorbent loading per volume compared with beaded materials in enough mass transfer rate, but with much lower pressure drop and in much fast heat transfer rates by reducing characteristic lengths of the transport distances at all scales of the adsorption and desorption process steps. As a result, the proposed technology ideally suits applications that involve large gas flow and are sensitive to pressure drop. Success of this technology for $CO_2$ capture application will open up many other opportunities, such as driers for conditioning, natural gas upgrade, etc.

SUMMARY

A structured adsorbent sheet, is provided including a nano-adsorbent powder, and a binder material, wherein the nano-adsorbent powder is combined with the binder material to form an adsorbent material, and a porous electrical heating substrate, wherein the adsorbent material is applied to the porous electrical heating substrate thereby forming a structured adsorbent sheet.

The nano-adsorbent powder may be a nano-particle adsorbent. The nano-adsorbent powder may be selected from the group consisting of crystal zeolite, activated carbon, activated alumina, silica gel, and metal organic framework (MOF). The size of the nano-adsorbent powder may be less than 1 micron, preferably less than 0.1 microns, preferably less than 0.01 microns. The size of nano-adsorbent powder may be between 0.1 and 1 micron, preferably between 0.02 and 0.5 micron.

The porous electrical heating substrate may be a wire mesh. The wire mesh may have a wire diameter of less than or equal to 1000 microns, preferably less than or equal to 500 microns. The wire mesh may have a center to center spacing of greater than 500 microns, preferably less than 5000 microns, preferably less than 1000 microns.

The porous electrical heating substrate may be nichrome, copper, aluminum, stainless steel, or carbon, alone or in combination. The adsorbent material as applied to the porous electrical heating substrate may have a thickness of between 50 and 1000 microns, preferably between 100 and 1000 microns, preferably 400 microns.

The nano-adsorbent powder may be modified by ion exchange or impregnated with promoters to enhance CO2 adsorption. The promoter may be amine.

A structured adsorbent module is provided, including a plurality of stacked structured adsorbent sheets, configured to produce a plurality of fluid passages, wherein the plurality of fluid passages have a cross-sectional shape in the direction of a fluid stream. The structured adsorbent module may have a cross-sectional shape that is trapezoidal, rectangle, square, triangular or sinusoidal.

A structured adsorbent bed is provided, including a plurality of modules, stacking the modules, thereby providing a plurality of process fluid passages, and a process fluid inlet and a process fluid outlet, in fluid communication with the plurality of process fluid passages.

The structured adsorbent bed may have modules that are made from the same or different adsorbent materials selected from zeolite, activated carbon, activated alumina, silica gel and MOF materials. The process fluid channels may have the same flow direction through each module in the bed. The electrical heating substrate in each module should have a good contact each other in the modules so electricity can be conducted throughout the entire bed.

BRIEF DESCRIPTION OF THE DRAWINGS

The invention may be understood by reference to the following description taken in conjunction with the accompanying drawings, and in which:

FIGS. 1A and 1B illustrate schematic representations of a structured adsorbent sheet in accordance with one embodiment of the present invention.

FIG. 4 represents estimated characteristic parameters for structured adsorbent.

DESCRIPTION OF PREFERRED EMBODIMENTS

Figure 2A:
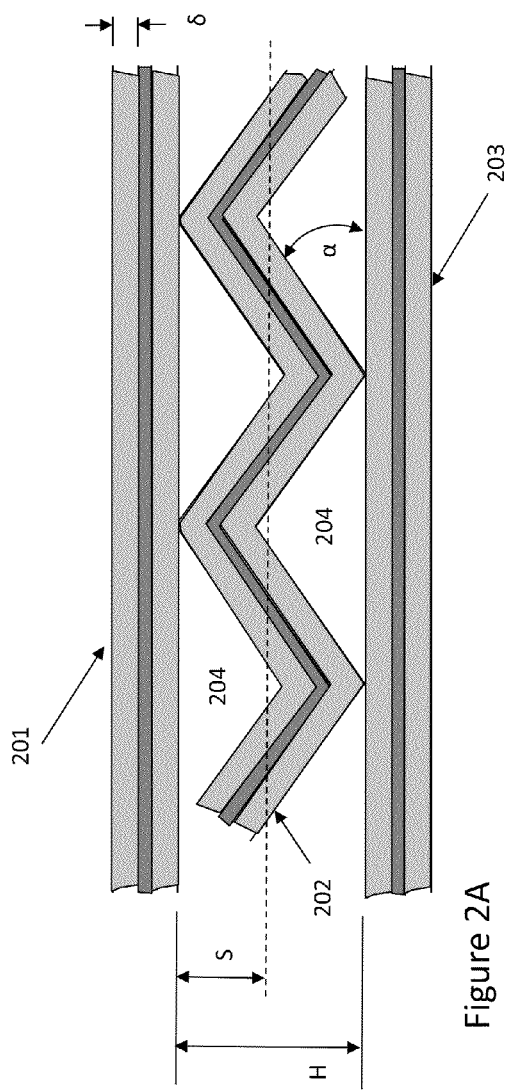
FIGS. 2A and 2B illustrate schematic representations of a structured adsorbent module in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, and as indicated in FIGS. 6A, 6B, 6C, and 6D, the following terms are defined:

Structured Adsorbent Sheet is the basic adsorbent, binder, mesh assembly.

Structured Adsorbent Module is an assembly of individual Structured Adsorbent Sheets.

Structured Adsorbent Bed is an assembly of individual Structured Adsorbent Modules.

Structured Adsorbent Unit is an assembly of individual Structured Adsorbent Beds.

In conventional cyclic adsorption process, the cycle time is determined by the mass and heat transfer rates of targeted gases into pores of adsorbent pellets or beads. These mass and heat transfer rates are a primary limiting fact for increasing bed productivity. Due to low heat transfer in and out of granular adsorbent, conventional TSA operation normally prohibits its cycle process from operating at much short time. Besides, the maximum gas space velocity inside the bed is restricted by the pressure drop and often by the bed fluidization limit. These are long-standing problems with the conventional adsorbent bed, and much pronounced when applied to large volume of process streams at near ambient pressure.

The ways to overcome these problems described above are to use a structured adsorbent packing. Structured adsorbents are well known in the art. For example, a thin laminated adsorbent sheet structures was fabricated by web coating slurried adsorbent mixture onto suitable support materials for PSA applications. But it is limited in the density of adsorbent material achievable in the laminate as a result of the search of high kinetics, meaning very small thickness as explained below.

In general, the characteristic heat and mass transfer time is proportional to the square of distance of mass and thermal transfer:

$$t_h \propto h^2/D_h$$

$$t_m \propto L^2/D_m$$

Where $t_h$ and $t_m$ are characteristic heat and mass transfer time. $D_h$ and $D_m$ are thermal and mass diffusivities, and h and L are transport distances. Therefore, reducing the thickness of adsorbent layer improves heat and mass transfer rates.

The mass and heat transfer rates increase in the structured adsorbent are not only due to the use of a thin layer of coated adsorbent but are also contributed by lowing gas flow boundary layer thickness along the channels. The mass transfer of adsorption molecules and heat flow from a gas phase to an adsorbed phase controlled by several steps, which include (1) diffusion in gas phase; (2) resistance from boundary layer; (3) macro-porous diffusion inside adsorbent; and (4) micro-porous diffusion in adsorbent. In conventional adsorption process, boundary layer resistance and macro-porous diffusion resistance are the primary mass transfer controlling steps.

Typically, the macro-porous inside adsorbent is created by the binder material which is normally used to form a different shape of adsorbent from crystal particle for an easy handling. The diffusion distance of molecules travelling inside macro-pores before them reach the micro-pore surface is dependent on the radii of beaded adsorbent or thickness of the coated layer. Conventionally, the particle size used in the adsorption processes is between 2 to 6 mm in diameter, therefore, the travelling distance of molecules diffusion inside the pores is around 1 to 3 mm. In the structured adsorbent technology for TSA application, the coating thickness of adsorbent layer can be less than 1 mm with the use of binder material to create macro-pore diffusional passage inside the thin adsorbent layer.

Referring now to FIGS. 1A, 1B, 2A, and 2B, the instant invention is discussed. The binder material should be selected to exhibit a strong adhesive capability to bind crystal adsorbent particles together on the metallic wire mesh 100 and creates super macro-pore passage inside the layer. For example, with 1 mm thickness H of structured adsorbent sheet 104, the molecular diffusional path reduces 50% and then its corresponding characteristic heat and mass transfer time increases 4 times in comparison with conventional beaded particle of 2 mm diameter. In addition, the gas space velocity in the structured adsorbent bed is much higher than it is in a conventional beaded bed because bed fluidization is not an issue in structured packing. Therefore, thickness of the boundary layer is much lower, which enhances transfer rates of both mass and heat through boundary layer and into the adsorbent.

The structured adsorbent sheet 104 is made by casting or coating adsorbent slurry which consists of adsorbent crystal and selected binder material 105 onto substrate material 100. The substrate material 100 is an electric conducting metallic heating wire mesh or screen with an appropriate mesh size 102,103 of pore opening. The wire diameter 101 can be for example around 0.05 mm or higher dependent on the electric energy and heating requirement. The substrate material can also be selected from thin metallic membrane, porous metallic sheet, metallic monolith . . . etc.

The adsorbent casting process is similar to the process of making cement concrete blocks for building construction with the substrate material as a support structure as shown in FIGS. 1A, 1B, 2A, and 2B. The shape of each adsorbent sheet 104 can be designed to fit special requirement. For example, it can be cast on a flat substrate sheet or a folded or curved shape. The flat adsorbent sheet 201, 203 and folded or curved adsorbent sheet 202 stacking together form a structured adsorbent module 200 in which straight flow channels 204 are designed and created for gas flow through the structured adsorbent module 200 at much less pressure resistance. The actual size of channel opening 204 can be designed based on process requirement.

The thickness $\delta$ of the structured adsorbent layer 105 for TSA application is preferred to be high to increase amount of adsorbent loading in comparison with PSA application. It can be approximately the same order of magnitude as the wire diameter 101 or higher, i.e. both being approximately in the range 50 to 1000 microns. The relative adsorbent volume load (adsorbent volume/adsorber volume) is dependent on the actual thickness $\delta$ of adsorbent layer 105 on each structured adsorbent sheet 104 and pore opening 102,103 on the wired mesh screen 100. For example, with wire mesh of wire diameter 101 of 100 microns and adsorbent coating thickness $\delta$ of 400 microns, the adsorbent loading can be reached is approximately 60% with fluid flow channel 204 opening 0.5 mm. This value of adsorbent loading is equivalent to a bed loading for standard beaded adsorbent material (~60%). The effective adsorbent load of the structured adsorbent bed, taking into account of 20% inert volume of the binder material necessary to maintain together the powder or crystals and to stick them onto the substrate is therefore in the order of 48% with is the same as the actual loading of conventional beaded adsorbents achievable. The adsorbent loading may decrease slightly if it is necessary to increase the channel opening 204 in order to reduce the pressure drop across the fluid flowing channel 204 for capturing CO2 from low pressure CO2 sources. With the 400 microns thickness $\delta$ of the structured adsorbent layer 105, the molecular diffusion distance has reduced 7.5 times compared with 3 mm diameter conventional beaded adsorbent. As a result, the characteristic heat and mass transfer time of molecules traveling inside the adsorbent layer decreases 56 times.

The above mentioned structured adsorbents were normally targeted to be used in a pressure swing adsorption operation, where enhancement of mass transfer rate for adsorbate diffusing into adsorbent pore network was a key factor. For thermal (electrical) swing adsorption process, improvement of adsorbent loading density per unit structured bed and of heat transfer rate during regeneration is a primary concern, transfer mass should remain fast enough but is not as critical as in PSA process for the CO2 capture application.

In this particular application, it is typically not necessary to remove all CO2 from the CO2 containing gas, such as maintaining the CO2 mass transfer zone inside the bed. This is for instance in the case for air purification in front of an ASU. Typically the CO2 is removed down to 0.1 ppm, thus decreasing the inlet CO2 content (from 400 to 500 ppm) by a factor more than one thousand.

Figure 3A:
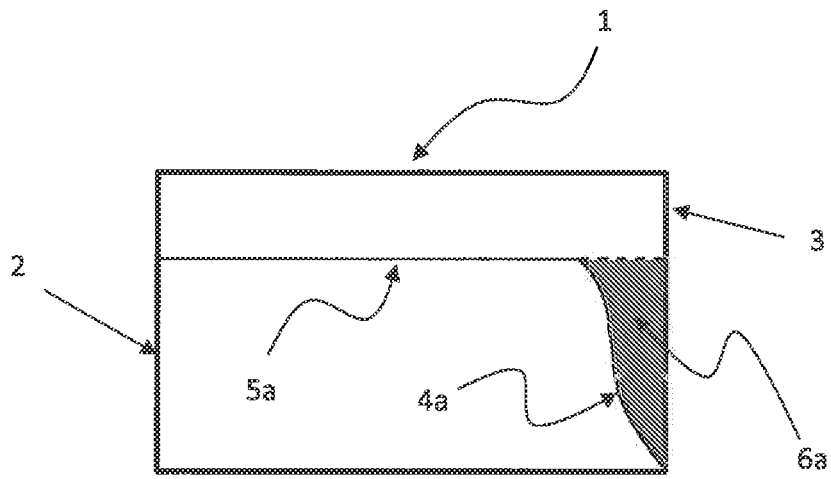
FIGS. 3A, 3B, and 3C illustrate a schematic representation of a mass transfer zone and its position in different cases in accordance with one embodiment of the present invention.
Figure 3B:
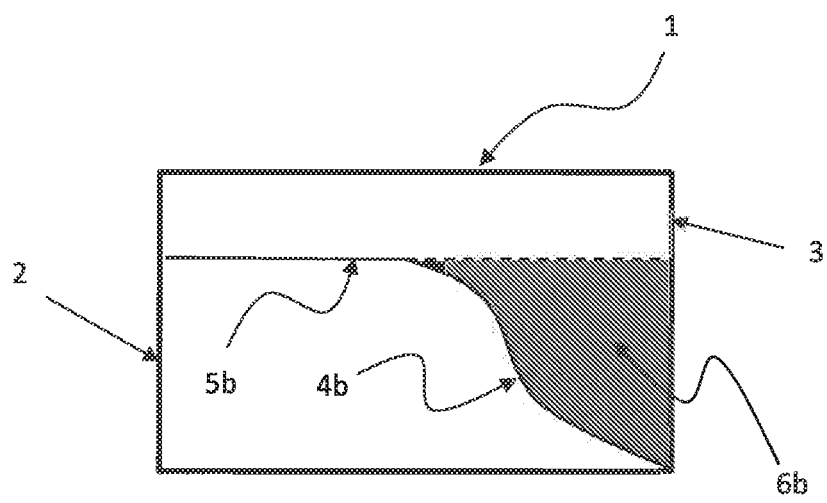
Figure 3C:
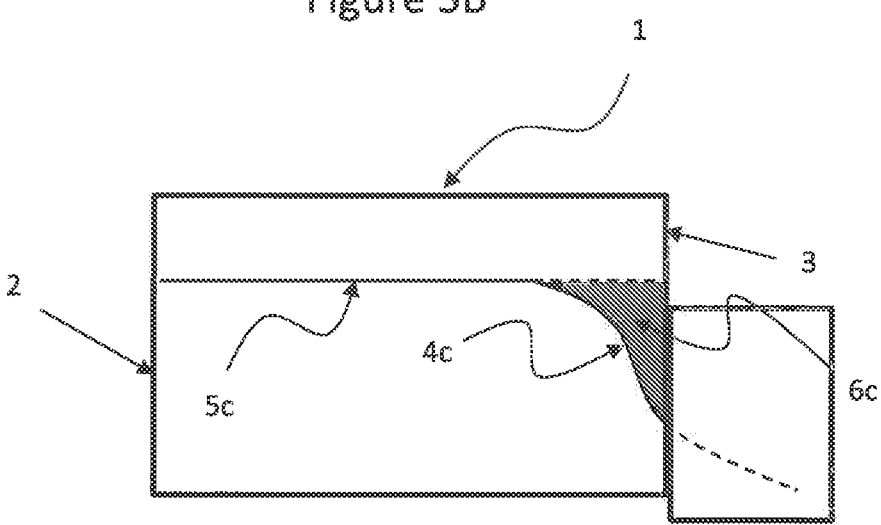

In the case of CO2 capture from its low concentration and low pressure sources, a recovery of 95, 90 even 85% will be a valuable target. This means we can afford to allow a small amount of CO2 to break through; therefore, a very high CO2 adsorption kinetics may not be necessary. FIGS. 3A, 3B and 3C show the mass transfer zone and its position in different cases. FIG. 3A shows schematically an adsorber bed 1 with a feed gas inlet 2 and outlet 3; the mass transfer front 4A and the saturation zone 5A. The area of 6A represents the adsorbent which is not saturated with adsorbate. FIG. 3A represents a case where the targeted adsorption species are completely captured within the bed. In other words, its mass transfer zone (MTZ) is in totality in the adsorber. Due to a good kinetics, the length of the MTZ is short, and therefore most of the adsorbent is fully used (loaded) where 6A represents only a small area.

Similarly as shown in FIG. 3A but with a lower value of the kinetics, the MTZ length is prolonged and the area of 6B corresponding to the non-saturated adsorbent becomes important. The productivity in term of quantity of feed being treated is noticeably less than in the first case shown in FIG. 3A. The adsorption kinetics shown in FIG. 3C is the same as in FIG. 3B but complete removal of the adsorbed species is not required. With a 95%+ recovery (instead of 100%), one can see it is possible (see area 6C) to obtain as good productivity as in the case shown in FIG. 3A.

For a TSA (ESA) application of the structured adsorbent bed, it is preferred to increase adsorbent casting thickness $\delta$ in order to maximize the adsorbent loading without too much compromise the mass and energy (heat) transfer rates. For example, with the same wire mesh 100 of wire diameter 100 microns and increasing the adsorbent coating thickness $\delta$ to 600 microns, the adsorbent loading increases to 69% by maintaining the same channel opening 204 at 0.5 mm. However, the molecular diffusion distance only reduces 5 times compared to conventional beaded material at particle diameter of 3.0 mm. As a result, the characteristic heat and mass transfer time of molecules traveling inside the adsorbent layer 105 decreases 25 times. This number is still enough for TSA operation. For example, with such improvement, it may reduce an 8-hours of conventional TSA half cycle time to less than 30 minutes half cycle time.

The structured adsorbent module 200 comprising a number of parallel straight flow channels 204 is made from individual adsorbent sheets 104. The adsorbent sheets 104 consist of nano-adsorbent fine powder (crystal) applied to a metallic wire mesh sheet substrate 100, or a macro-porous, thin, metallic membrane or metallic monolith, more generally of a power conducting and electrical heating material, selected from the materials which have better electric conductivity and carrier properties, such as Nichol, copper, aluminum, stainless steel, carbon or combination of these materials. The process of fabrication of the adsorbent sheets 104 includes casting (coating) the nano-adsorbent fine powder (or a nano zeolite crystal particle) onto the substrate wire mesh sheet 100 with the help of selected binding material. This binding material glues nano particle together and is then converted to macro-porous frameworks inside adsorbent layer 105 after thermal treatment. The macro-porous structured of the frameworks create macropore diffusion passage to increase mass and energy transport rates inside the adsorbent layer 105. In addition, this nano-adsorbent fine powder or zeolite crystal is modified (ion exchanged) or impregnated with certain promoters to enhance CO2 adsorption, such as amine impregnation, if CO2 adsorption is a targeted application.

The preferred thickness $\delta$ of the nano-adsorbent fine powder layers 105 on the wire sheet 100 is dependent on the application and is in the range of 0.1 to 1 mm. For a PSA application, higher molecular mass transfer rate inside the adsorbent layer is desired, therefore, a short molecular diffusion length, in other words, thinner adsorbent layer, is preferred. On the other hand, for a TSA (ESA) application, the amount of adsorbent loading per bed is a primary concern within the acceptable mass and heat (energy) transfer rate compared with conventional beaded adsorbent. Increase the adsorbent layer thickness $\delta$; enhance the loading of the adsorbent in the bed. In the design of the structured adsorbent sheet, the wire thickness (diameter) 101 of the substrate wire mesh 100 itself is less than 1.0 mm, preferentially less than 0.5 mm. The actual wire diameter 101 is determined based on the electric heating material used as the substrate and amount of power requirement for heating the structured adsorbent module, as well as mesh size of wire grid opening. The amount of mesh size 102,103 of grid support can also be determined based on mechanical strength requirement for the structured adsorbent sheet 104, amount of binder material used in the process, potential thermal contraction and expansion of the wire material during TSA cycle, etc.

Figure 5A:
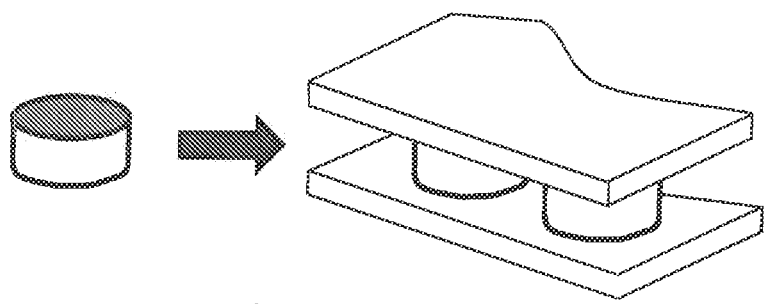
FIGS. 5A, 5B, and 5C illustrates a schematic representation various sheet spacers in accordance with one embodiment of the present invention.
Figure 5B:
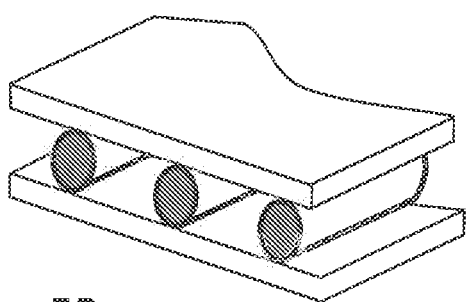
Figure 5C:
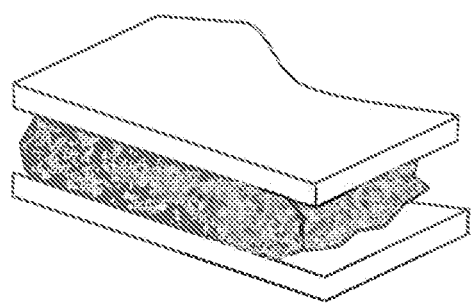
Figure 6A:
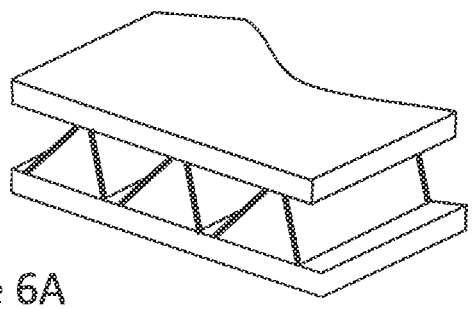
FIGS. 6A, 6B, 6C, and 6D illustrated a schematic representation of the various shapes of corrugations that may be used in accordance with one embodiment of the present invention.
Figure 6B:
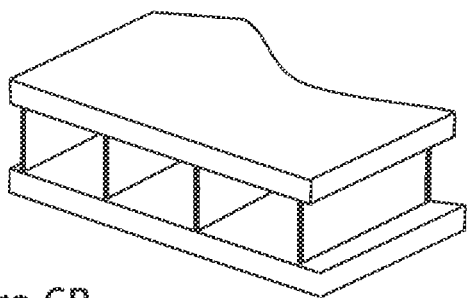
Figure 6C:
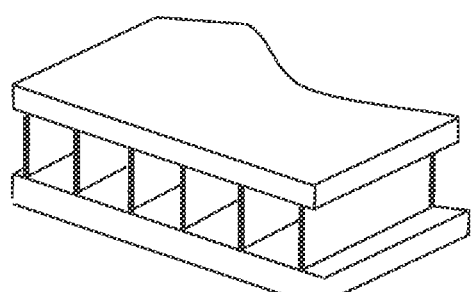
Figure 6D:
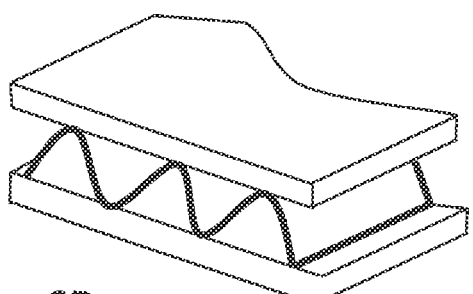
Figure 7:
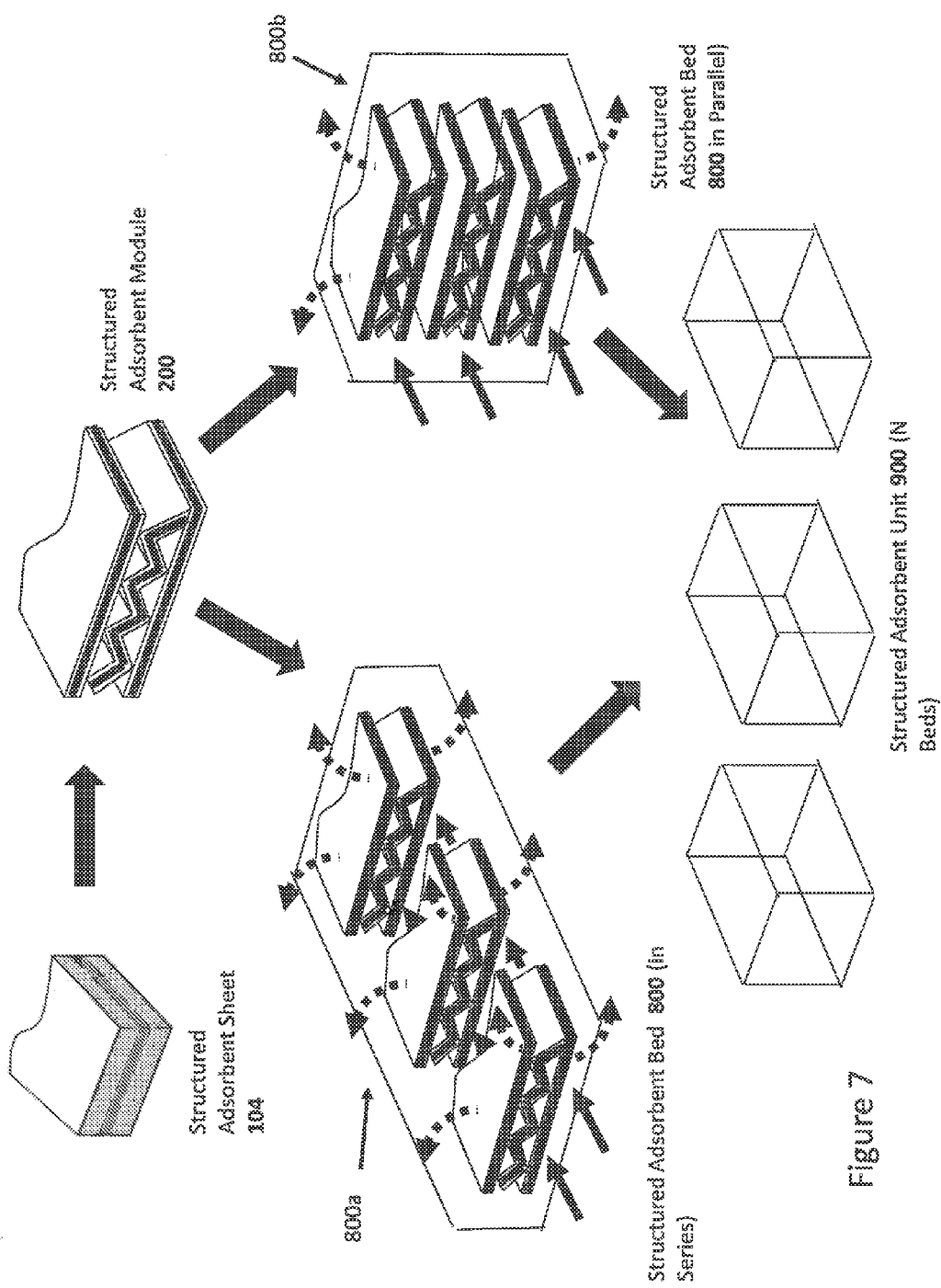
FIG. 7 illustrates a schematic representation of the relationship between an adsorbent sheet, adsorbent module, adsorbent bed, and adsorbent unit in accordance with one embodiment of the present invention.
Figure 8:
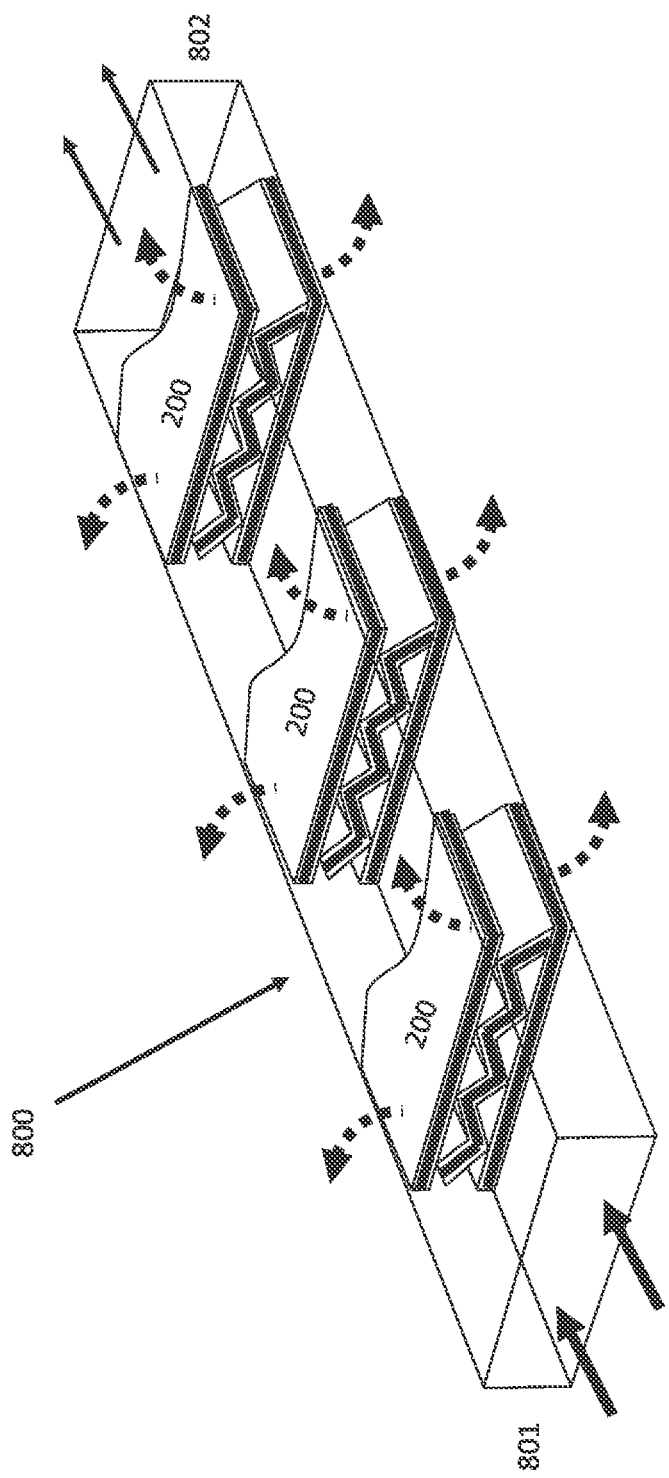
FIG. 8 illustrates a schematic representation of a structured adsorbent bed in accordance with one embodiment of the present invention.

Different shapes and forms of channels 204 can be created for fluid to flow between adsorbent sheets 201, 202. To enhance the adsorbent loading per volume of structured module, the channels 204 are made from the same adsorbent sheet material 104. The adsorbent sheet 104 can be made in different shapes and forms. For example, it can be made by folding the adsorbent sheet 104 in a curvature, triangular or rectangular shape. The individual straight and curved adsorbent sheets 104 stacking together form straight flow channels 204. In addition, as indicated in FIGS. 5A, 5B, and 5C, the channels 204 can be made from by inserting coated discs 5A, wires 5B, foams 5C, membranes or random wires as mattress types. These inserting materials are preferably coated with nano-adsorbent fine powder to enhance adsorbent loading in the structured bed. The channel opening 204 is controlled by curved shape of the individual adsorbent sheet, which is in a range of 0.1 to 2 mm distance. The actual channel opening 204 can be designed based on the TSA process requirement; such as gas superficial space velocity, cycle time, mass and energy transfer rates, etc.

The channels 204 are created in the same direction as fluid flows through the bed. The structured adsorbent module is formed by stacking two straight adsorbent sheets adjacent to the curved adsorbent sheet or inserted adsorbent coated materials as a sandwich-type structured adsorbent. The channels 204 separated by curvature shaped adsorbent sheet allow process gas and regeneration fluid or regeneration purge fluid to pass through, where $CO_2$ is readily adsorbed onto the nano-adsorbent crystal layers during adsorption step and released from the adsorbent during high temperature regeneration process.

Regeneration of adsorbent is achieved by raising the bed temperature with electrical energy. By selecting a good electrical conducting substrate material, such as copper, aluminum, stainless steel, carbon, or combination of them, the metal substrate wire mesh can be quickly heat up with electricity to a desired temperature. Due to direct contact of build-in electric thermal elements with coated adsorbent, and thinner adsorbent coating layer (less than 1 mm thickness) compared to conventional beaded adsorbent material on the wire mesh substrate, the heat energy of thermal flow can be rapidly transferred into the adsorbent by thermal conduction and convection with a small amount of gas purge; therefore, it releases the adsorbed $CO_2$ from the surface of the adsorbent and the released rich CO2 is further carried out with small regeneration purge flow. More importantly, during the heating of the adsorbent bed, the adsorbent inside the bed are heated homogenously throughout the whole volume of the bed with supplied electric energy. In other words, the adsorbent temperature at the top and bottom of the bed is raised simultaneously. The released CO2 remains in the gas phase, and then is readily moved out off the bed with a small amount purge fluid. This is different than the conventional regeneration process where the introduced hot regeneration fluid has to flow from one end to another. The temperature wave front gradually moves through the bed due to thermal exchange caused by heat transfer. These heating and cooling steps in conventional TSA process are normally the controlling step and are energy intensive. More specifically, the amount regeneration fluid is normally limited and flow rate tends to be low to minimize energy requirement. The released CO2 from hot adsorbent zone is partial adsorbed onto cool adsorbent in the fluid flow direction because of increase of CO2 partial pressure in gas phase in cool adsorption reign. Therefore, it takes longer time to regenerate the adsorbent bed with conventional regeneration process compared to the electric heating process of the present invention. In addition, small amount of purge fluid during regeneration process enhances thermal transfer of convection effect to help homogenizing the bed temperature in the structure and avoiding hot surfaces or spots, for example, near the electrical wires. The purge fluid can also effectively remove the desorbed CO2 from the bed in present invention. In order to not dilute the CO2 desorbed, it is preferable of use a CO2 rich stream as the purge. In addition to the benefit of promoting homogenous heating of entitle adsorbent with small amount CO2 rich purge stream, it can also avoid components such as water or other impurities migrating to the downstream by purging the bed in counter-current direction (from top of the bed to bottom).

The bed cooling, or partial cooling, can be achieved by purging the bed with $CO_2$ lean feed effluent stream or feed gas, preferentially by nitrogen through the structured bed channel 204 after disconnection of the electric power supply sources. The adsorbent should be cooled down rapidly due to much shorter heat transfer distance in the structured adsorbent layer compared to conventional beaded material.

To compare with conventional beaded adsorbent bed, FIG. 4 lists the estimated characteristic parameters of structured adsorbent.

Figure 2B:
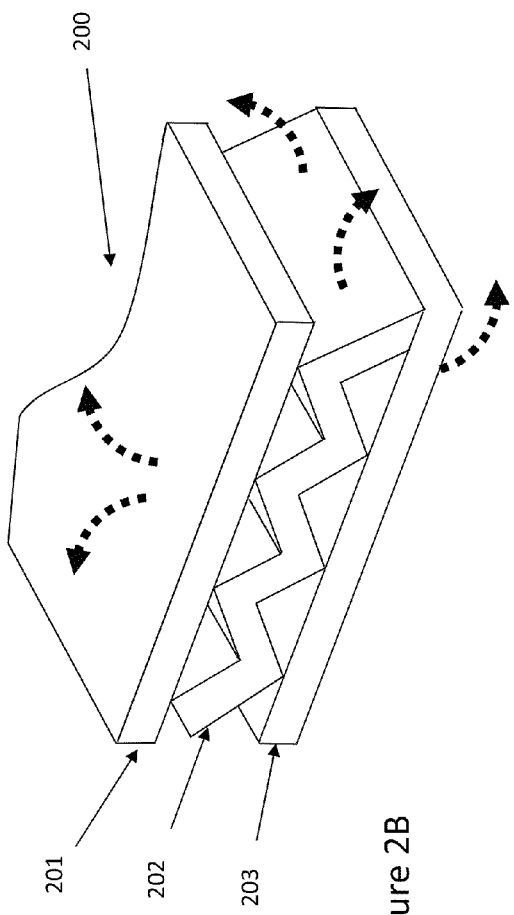

In FIGS. 2A and 2B, the folded or curved structured adsorbent sheets are used to create flow channel 204, for example in the form of triangle.

The actual shape of the structured bed can be varied depending on the applications. It can be designed as a planar shape of structured adsorption TSA bed type or circuit shape of structured adsorbent column. One possible configuration for adsorption vessels of the present invention is to insert a roll of the structured beds. The structured bed consists of modules stacked together. Each module consists of thin porous adsorbent sheets with straight and curved sheets adjacent each other as sandwich type to form channels 204 between repeating layers; this type of bed is suitable for producing large rolls that can fill cylindrical adsorption bed. This configuration brings the advantage of low construction cost.

The structure adsorbent sheet is made from nano-particle or crystal zeolite adsorbent with binder material gluing together onto a substrate support framework made from electric conducting materials. Thick adsorbent layer is used with build-in electric wire mesh substrate for TSA application to improve heat transfer property, at meantime maintaining reasonable fast mass transfer characteristic of the structured material. The flow channels 204 in the structured bed are formulated from adsorbent sheet with straight and curved adsorbent sheets sandwiched together. The adsorbent regeneration is carried out by electric energy with build-in electric filaments as wire mesh substrate to uniformly heat adsorbent quickly by thermal conduction and convection. The entire adsorbent bed is heated homogenously with potential less energy requirement with small amount of purge fluid to avoid hot surface and meantime to carry out desorbed CO2. Less regeneration gas (CO2 rich stream) is needed compared with conventional beaded adsorbent bed.

A method of purifying a fluid stream with a structured adsorbent unit is provided. The method includes at least one structured adsorbent unit 900 with a cycle time C, each structured adsorbent unit 900 comprising N adsorbing beds 800, wherein N is greater than or equal to 3, each adsorbing bed 800 comprising at least 2 adsorbent modules 200, each adsorbent module 200 comprising a plurality of stacked sheets 201, 202, 203, each sheet comprising a nano-adsorbent powder affixed together with binder material 105 onto a porous electrical heating substrate 100.

Each bed 800 is subjected to a sequence comprising, in succession, an adsorption cycle, and a regeneration cycle. Each bed is out of phase with the cycle for all the other vessels, provided that at least two vessels (beds) are in the adsorption step at any time, wherein there is a lag time between the start of cycles in successive beds.

Figure 9A:
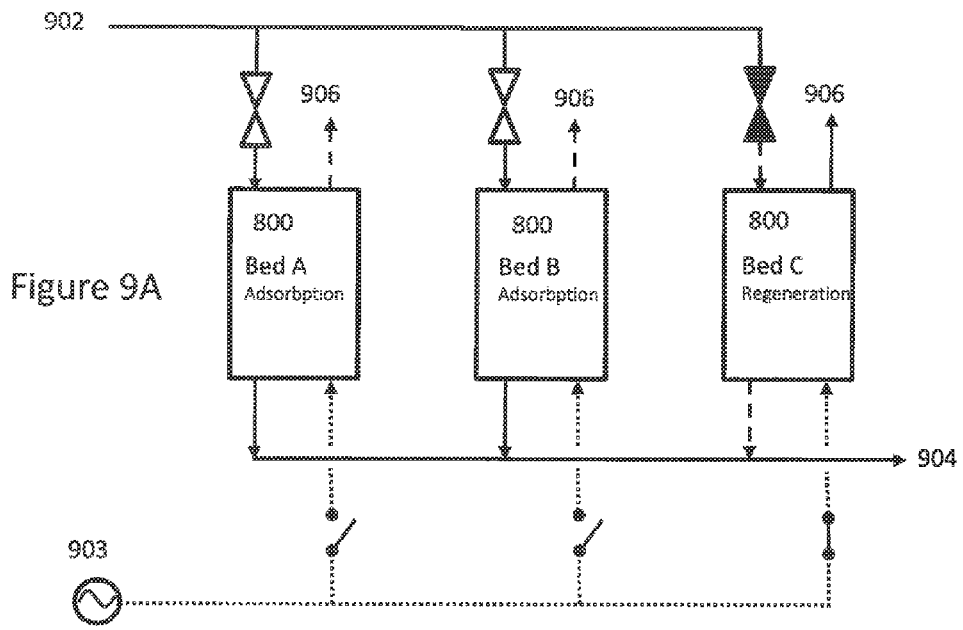
FIGS. 9A, 9B, and 9C, illustrate a schematic representation of a series of adsorption and regeneration cycles in accordance with one embodiment of the present invention.
Figure 9B:
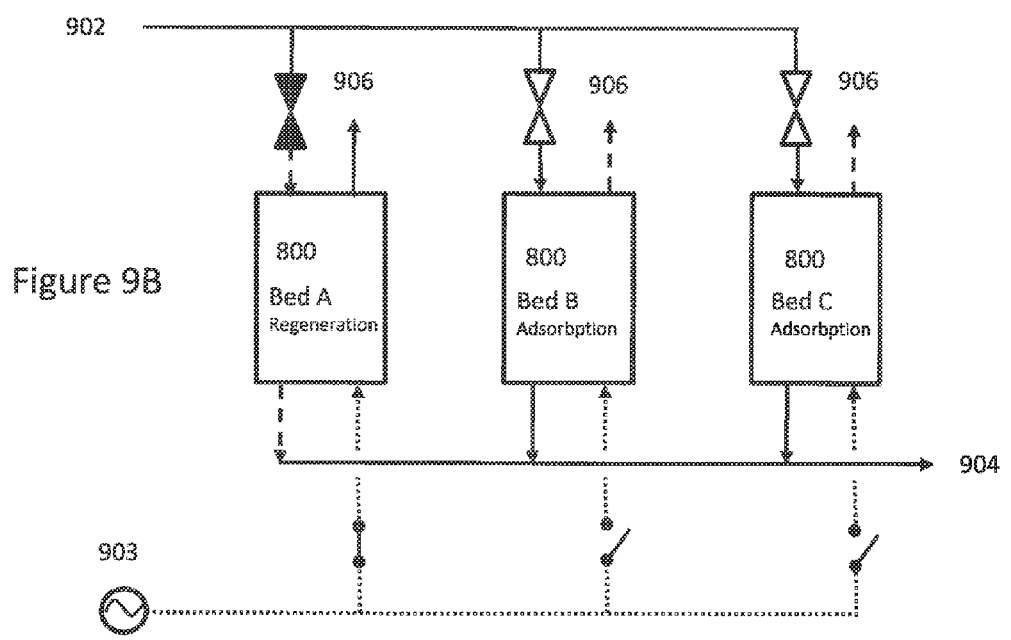
Figure 9C:
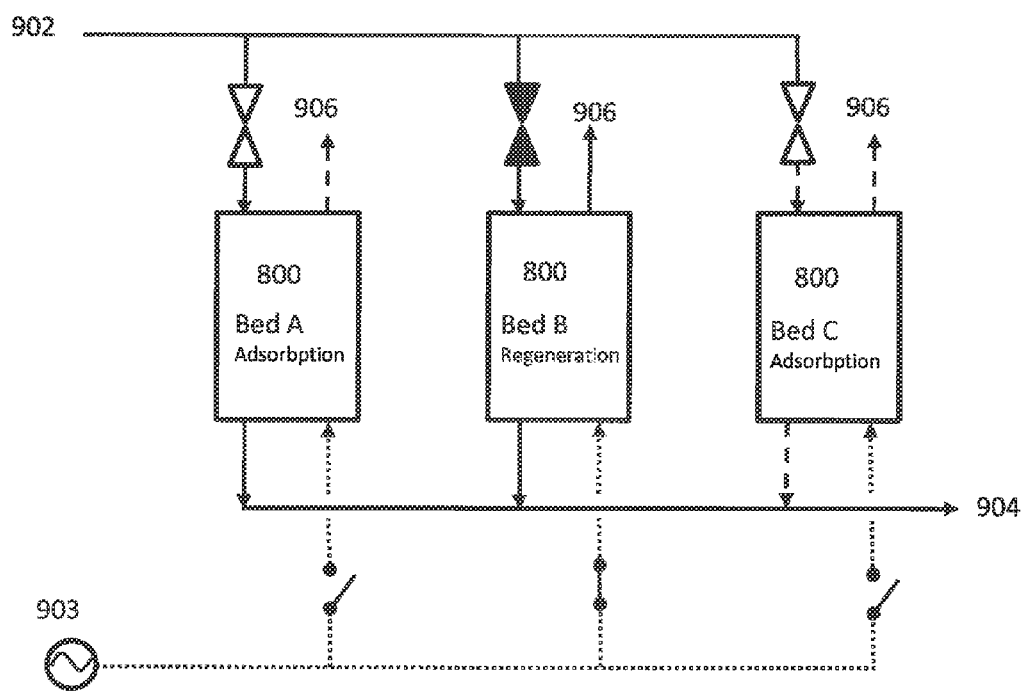
Figure 10A:
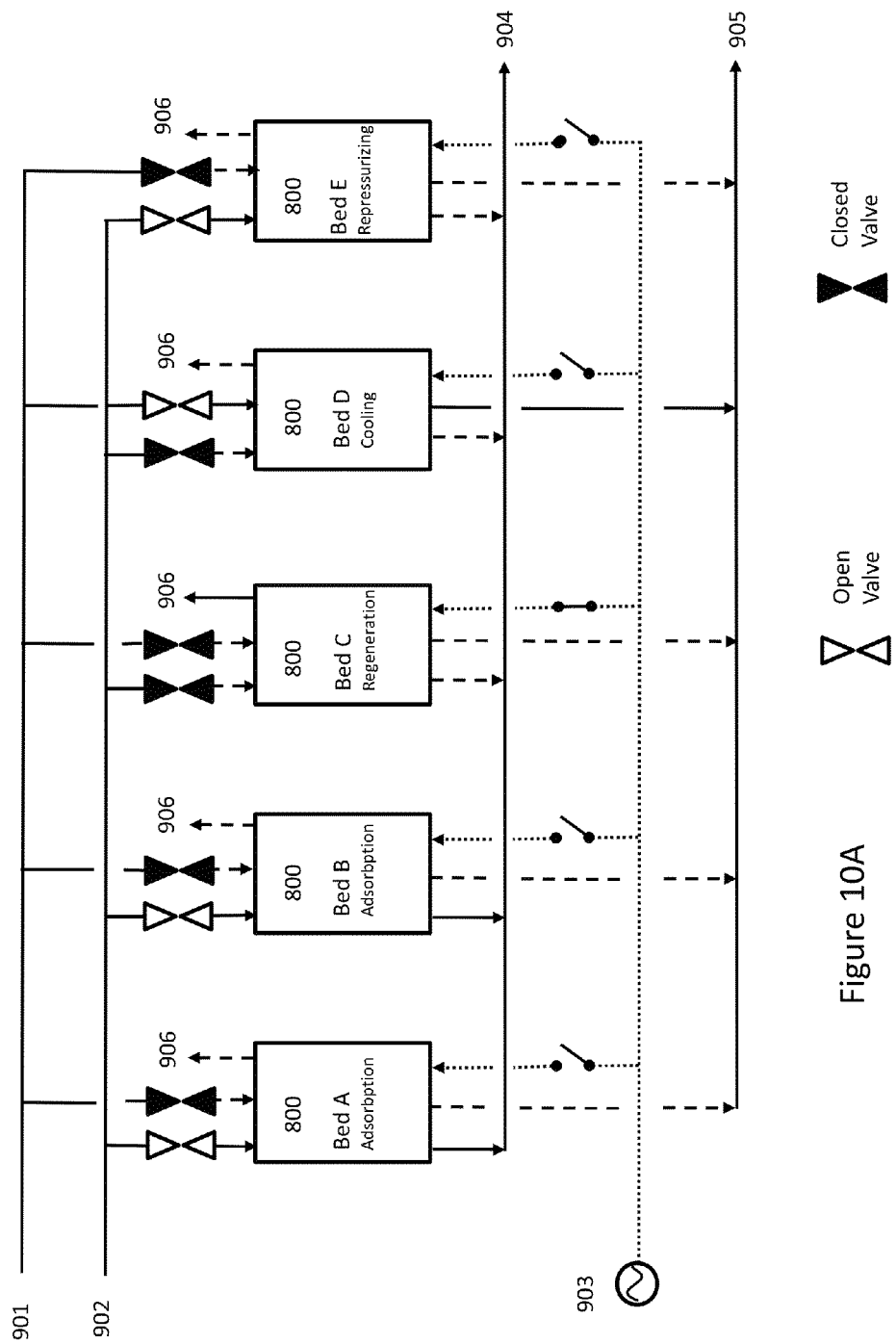
FIGS. 10A, 10B, 10C, 10D, and 10E illustrate a schematic representation of a series of adsorption, regeneration, cooling and repressurizing cycles in accordance with one embodiment of the present invention.
Figure 10B:
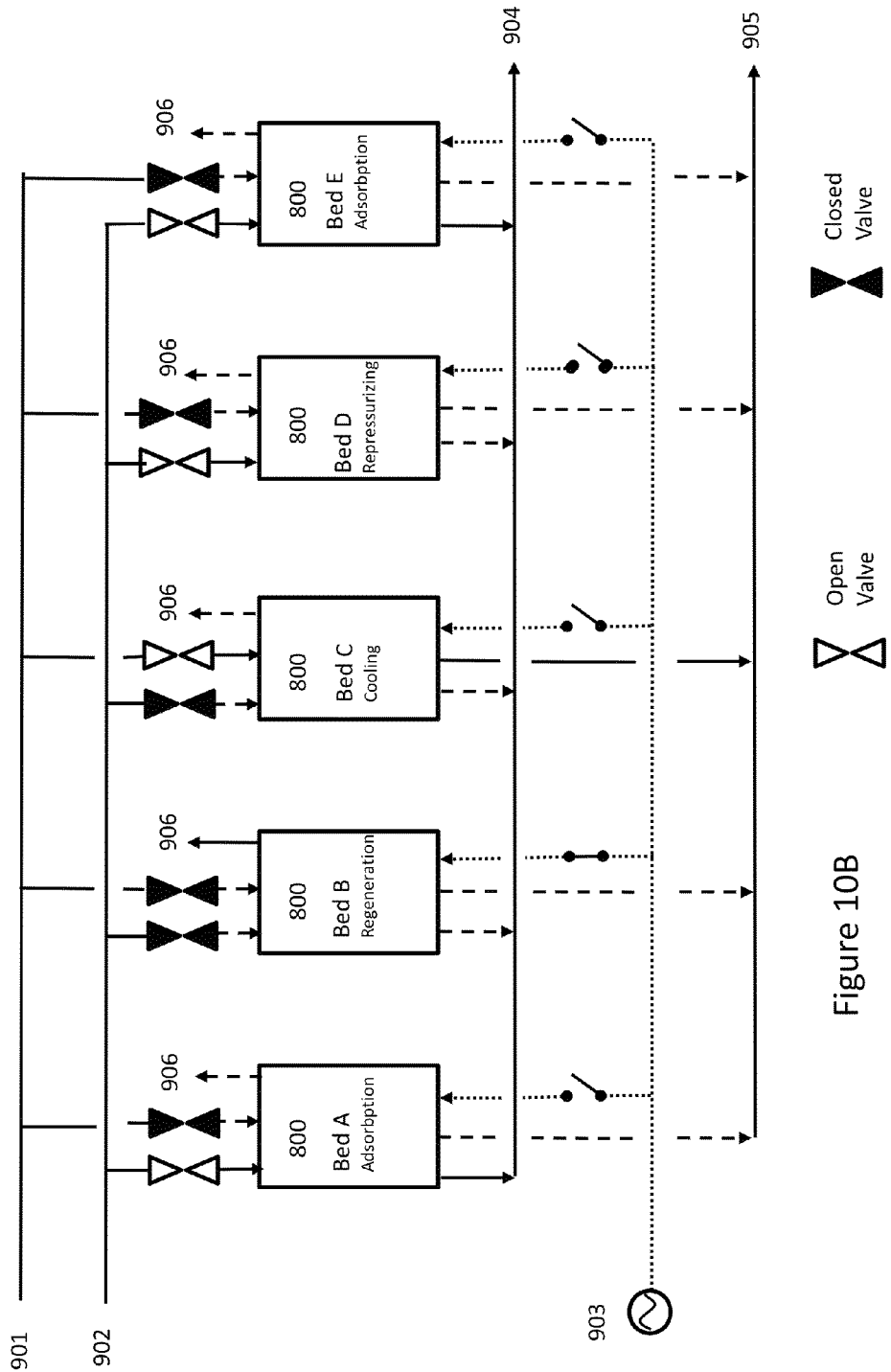
Figure 10C:
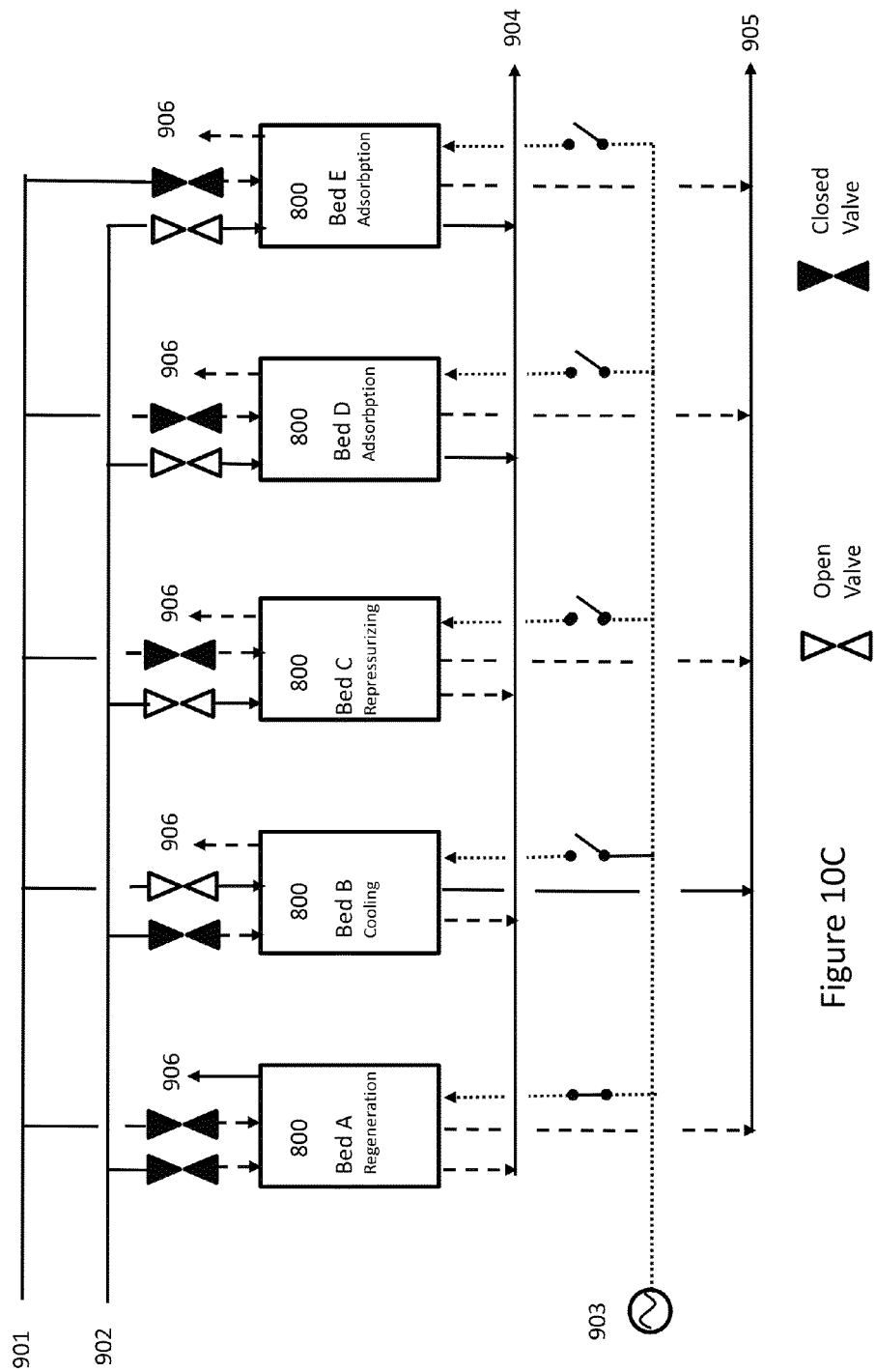
Figure 10D:
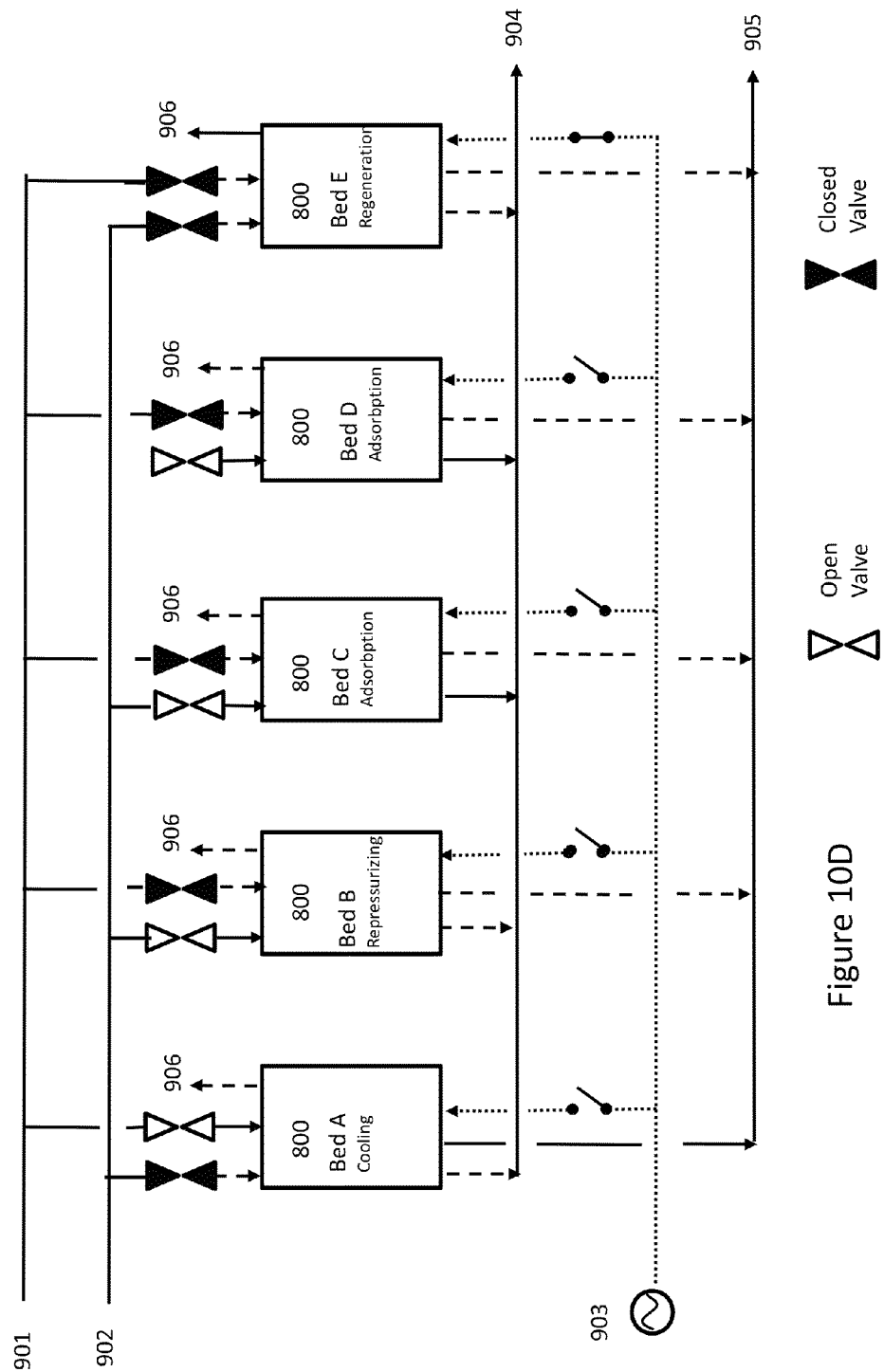
Figure 10E:
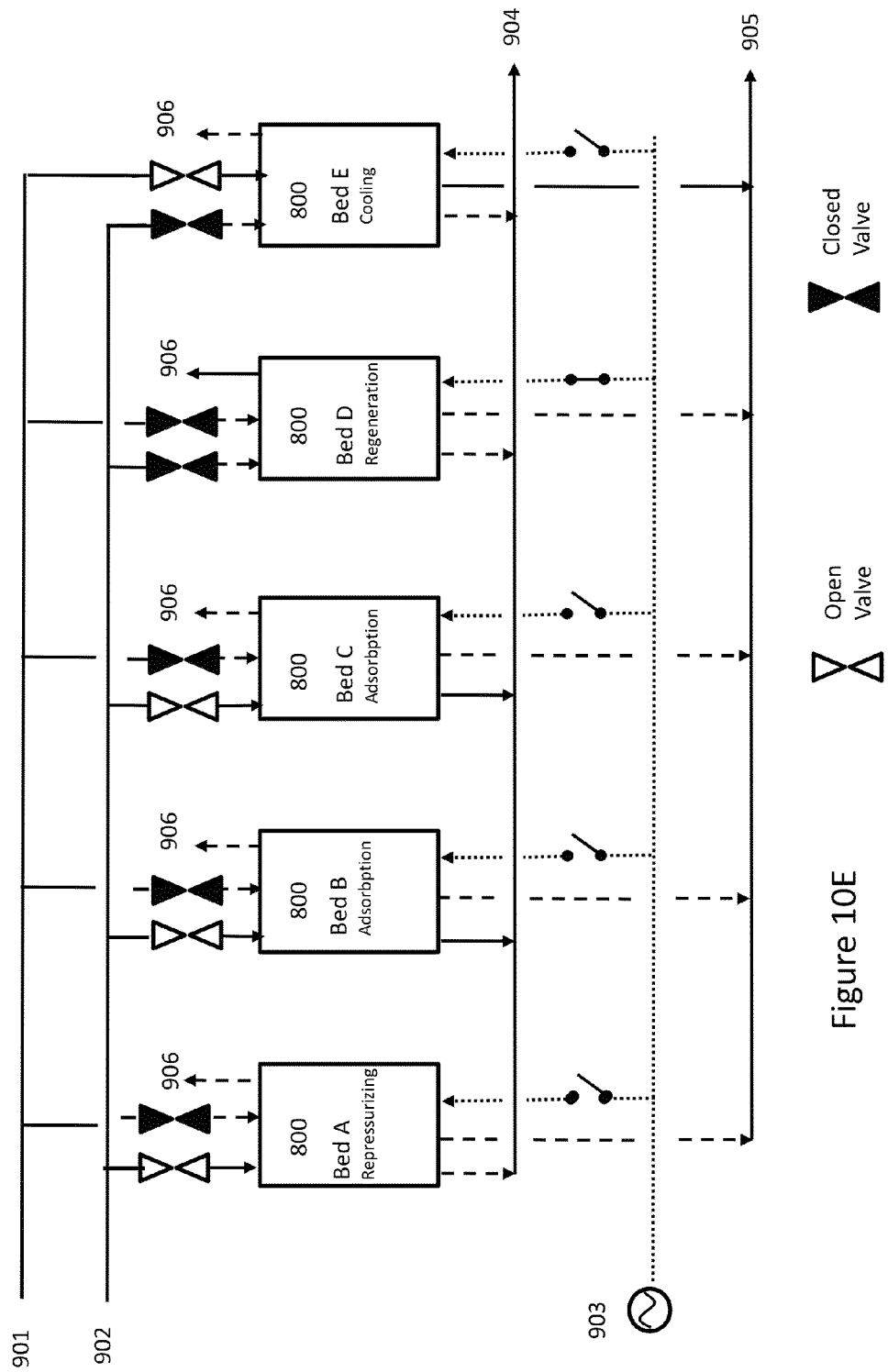

A non-limiting example of this is illustrated in FIGS. 9A, 9b, and 9C. During a first time period (9A), bed A and bed B are in an adsorption cycle. Fluid stream 902 is introduced to bed A and bed B, after which the targeted adsorption species (e.g. CO2) is adsorbed and product gas stream 904 is produced. Simultaneously, bed C is in a regeneration cycle. Fluid stream 902 does not enter this bed, but electricity 903 is allowed to heat the electrical heating substrate 100. This desorbs the targeted adsorption species, which is released as stream 906.

During a second time period (9B), recently regenerated bed C is now in adsorption mode, along with bed C. During this time period, bed A is being regenerated as explained above. Likewise, during a third time period (9C), recently regenerated bed A is back in adsorption mode, and now bed C is being regenerated.

The adsorption cycle may include introducing a fluid stream 902 comprising a first component and a second component into the process fluid inlet the structured adsorbent bed, thereby producing an outlet stream 904 rich in the first component and depleted in the second component, and enriching the nano-adsorbent with the second component, and removing the outlet stream from the process fluid outlet.

The regeneration cycle may include introducing an electrical current 903 into the porous electrical conducting substrate 100 of the structured adsorbent bed 800, thereby increasing the bed temperature for regenerating the structured adsorbent module and releasing the second component 906.

The method may further include a cooling phase, comprising, introducing a cooling fluid stream into the process fluid inlet of the structured adsorbent bed, thereby cooling the regenerated adsorbent.

The method may further include a re-pressurization phase before starting a new cycle. The lag time is the lag time the C/N.

A non-limiting example of this is illustrated in FIGS. 10A, 10B, 10C, 10D, and 10E. During a first time period (10A), bed A and bed B are in an adsorption cycle. Fluid stream 902 is introduced to bed A and bed B, after which the targeted adsorption species (e.g. CO2) is adsorbed and product gas stream 904 is produced. Simultaneously, bed C is in a regeneration cycle. Fluid stream 902 does not enter this bed, but electricity 903 is allowed to heat the electrical heating substrate 100. This desorbs the targeted adsorption species, which is released as stream 906. Simultaneously, bed D is in a cooling cycle. A cooling fluid 901 is introduced into the heated, regenerated bed and discharged as spent stream 905. Simultaneously, bed D is in a repressurizing cycle. A repressurizing stream, illustrated as being stream 902, but it can be any suitable stream that is available, is introduced into the bed which is then pressurized.

During a second time period (10B), recently regenerated bed C is now in cooling mode, as explained above. During this time period, bed B is being regenerated as explained above. Cooled bed D is being repressurized as explained above. Repressurized bed E is now in an adsorption cycle, as is bed A.

During a second time period (10B), recently regenerated bed C is now in cooling mode, as explained above. During this time period, bed B is being regenerated as explained above. Cooled bed D is being repressurized as explained above. Repressurized bed E is now in an adsorption cycle, as is bed A.

During a third time period (10C), recently regenerated bed B is now in cooling mode, as explained above. During this time period, bed A is being regenerated as explained above. Cooled bed C is being repressurized as explained above. Repressurized bed D is now in an adsorption cycle, as is bed E.

During a fourth time period (10D), recently regenerated bed A is now in cooling mode, as explained above. During this time period, bed E is being regenerated as explained above. Cooled bed B is being repressurized as explained above. Repressurized bed C is now in an adsorption cycle, as is bed D.

During a fifth time period (10E), recently regenerated bed E is now in cooling mode, as explained above. During this time period, bed D is being regenerated as explained above. Cooled bed A is being repressurized as explained above. Repressurized bed B is now in an adsorption cycle, as is bed C.

The adsorption cycle may include introducing a fluid stream 902 comprising a first component and a second component into the process fluid inlet the structured adsorbent bed, thereby producing an outlet stream 904 rich in the first component and depleted in the second component, and enriching the nano-adsorbent with the second component, and removing the outlet stream from the process fluid outlet.

An electrical swing adsorption method for separating a gas mixture is provided. The method includes separating a more adsorbable component A, and more than 50% of a less adsorbable component B, with a structured adsorbent unit comprising a cycle time C, each structured adsorbent unit comprising N structured adsorbent beds 800, each structured adsorbing bed 800 comprising a plurality of stacked sheets 201, 202, 203, each sheet comprising a nano-adsorbent powder affixed together with binder material 105 onto a porous electrical heating substrate 100. Each bed 800 is subjected to a sequence comprising, a repeating cycle of steps including an adsorption cycle. The cycle includes introducing the gas mixture 901 into the process fluid inlet the structured adsorbent module, thereby producing an outlet stream 904 rich in the component B and depleted in the component A, and enriching the nano-adsorbent with the component A, and removing the outlet stream from the process fluid outlet, wherein the recovery of component A is less than 100%. The cycle also includes a regeneration cycle, including introducing an electrical current 903 into the porous electrical conducting substrate 100 of the second structured adsorbent module, thereby increasing the bed temperature for regenerating the structured adsorbent module and releasing the second component, wherein there is a lag time between the start of cycles in successive beds.

The method may also include a cooling phase, including introducing a stream comprising more than 50% of component B into the process fluid inlet of the third structured adsorbent module, thereby cooling the regenerated adsorbent.

The method may also include a re-pressurization phase before starting a new cycle. There is a lag time is C/N. The recovery of component A may be less than 95%, preferably less than 90%.

An electrical swing adsorption method for separating a gas mixture is provided. This method includes separating a gas mixture 901 that contains a more adsorbable component A, and more than 50% of a less adsorbable component B. The method includes providing an adsorbent structure suitable for adsorbing a component A, of the parallel passage contractor type, introducing the gas mixture into the adsorbent structure, wherein the recovery of component A is less than 100%. Then heating the adsorbent structure to desorb the adsorbed species, and cooling the adsorbent structure with a stream comprising more than 50% of component B. The recovery of component A is less than 95%, preferably less than 90%.

What is claimed is:

1. A method of purifying a fluid stream with a structured adsorbent unit comprising, at least one structured adsorbent unit with a cycle time C, each structured adsorbent unit comprising N adsorbing beds, wherein N is greater than or equal to 3, each adsorbing bed comprising at least 2 adsorbent modules, each adsorbent module comprising a plurality of stacked sheets, each sheet comprising a nano-adsorbent powder affixed together with binder material onto a porous electrical heating substrate, in which each bed is subjected to a sequence comprising, in succession, an adsorption cycle, and a regeneration cycle, wherein each bed is out of phase with the cycle for all the other beds, provided that at least two beds are in the adsorption step at any time, wherein there is a lag time between the start of cycles in successive beds.

2. The method of claim 1, wherein said adsorption cycle comprises, introducing a fluid stream comprising a first component and a second component into the process fluid inlet the structured adsorbent bed, thereby producing an outlet stream rich in the first component and depleted in the second component, and enriching the nano-adsorbent with the second component, and removing the outlet stream from the process fluid outlet.

3. The method of claim 1, wherein said regeneration cycle comprises, introducing an electrical current into the porous electrical heating substrate of the structured adsorbent bed, thereby increasing the bed temperature for regenerating the structured adsorbent module and releasing the second component.

4. The method of claim 1, further comprising a cooling phase, comprising, introducing a cooling fluid stream into the process fluid inlet of the structured adsorbent bed, thereby cooling the regenerated adsorbent.

5. The method of claim 1, further comprising a re-pressurization phase before starting a new cycle.

6. The method of claim 1, wherein the lag time is C/N.

* * * * *